United States Patent [19]
Oskouy et al.

[11] Patent Number: 5,745,684
[45] Date of Patent: Apr. 28, 1998

[54] APPARATUS AND METHOD FOR PROVIDING A GENERIC INTERFACE BETWEEN A HOST SYSTEM AND AN ASYNCHRONOUS TRANSFER MODE CORE FUNCTIONAL BLOCK

[75] Inventors: Rasoul M. Oskouy, Fremont; Louise Yeung, Redwood City, both of Calif.

[73] Assignee: Sun Microsystems, Inc., Mountain View, Calif.

[21] Appl. No.: 554,074

[22] Filed: Nov. 6, 1995

[51] Int. Cl.⁶ .................................................. H04L 12/00
[52] U.S. Cl. ........................................................ 395/200.8
[58] Field of Search ...................... 395/200.01, 200.06, 395/200.07, 200.12, 200.13, 200.14, 200.16, 200.2, 285, 286, 292, 842, 849, 853, 855, 859, 728

[56] References Cited

U.S. PATENT DOCUMENTS

| 5,193,149 | 3/1993 | Awiszio et al. ...................... 395/200.2 |
| 5,309,567 | 5/1994 | Mizukami ................................ 395/290 |
| 5,566,304 | 10/1996 | Regal ....................................... 395/285 |

FOREIGN PATENT DOCUMENTS 5-334261 12/1993 Japan .
WO92/22034 12/1992 WIPO .
WO94/02891 2/1994 WIPO .

OTHER PUBLICATIONS

Mano M. Morris, Computer System Architecture, N.J., Pentice–Hall, 1982, pp. 445–446, QA 76.9A73 M3, 1982.
"Asynchronous Transfer Mode Receiver," IEE Proceedings–E, vol. 139, No. 5, Sep. 1992.

*Primary Examiner*—Lance Leonard Barry
*Attorney, Agent, or Firm*—Blakely Sokoloff Taylor & Zafman

[57] ABSTRACT

A generic Input/Output interface between an IO block and a System and ATM Layer Core on a network interface circuit is provided. The GIO interface includes parallel DMA read and write control handshake signal lines; parallel DMA read and write data handshake signal lines which operate independently from the read and write control handshake signal lines; parallel DMA read and write data signal lines; and a single clock signal line. GIO interface facilitates maximum utilization of the IO bandwidth, and allows several requests to be queued across the GIO interface at the same time, in each read and write direction. In addition, the GIO interface utilizes a fixed clock for driving the transmit and receive data path. By thus referencing all transactions to a clock driving the Core, the Core remains unchanged for different embodiments of the network interface circuit which interface to different host computer systems and busses.

22 Claims, 12 Drawing Sheets

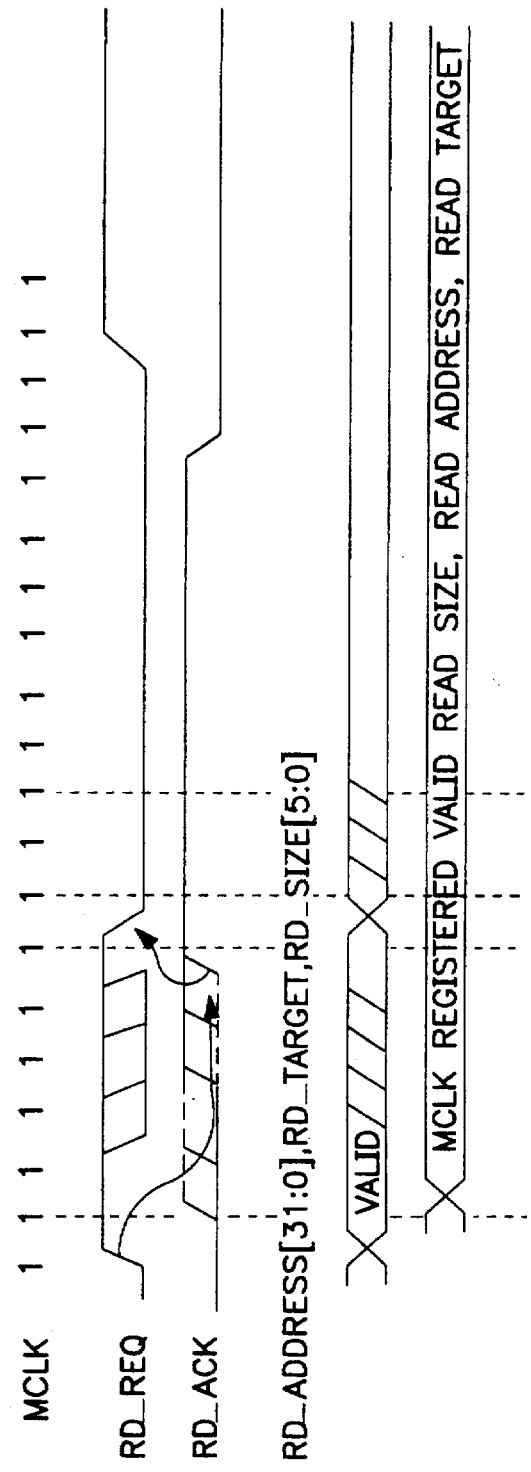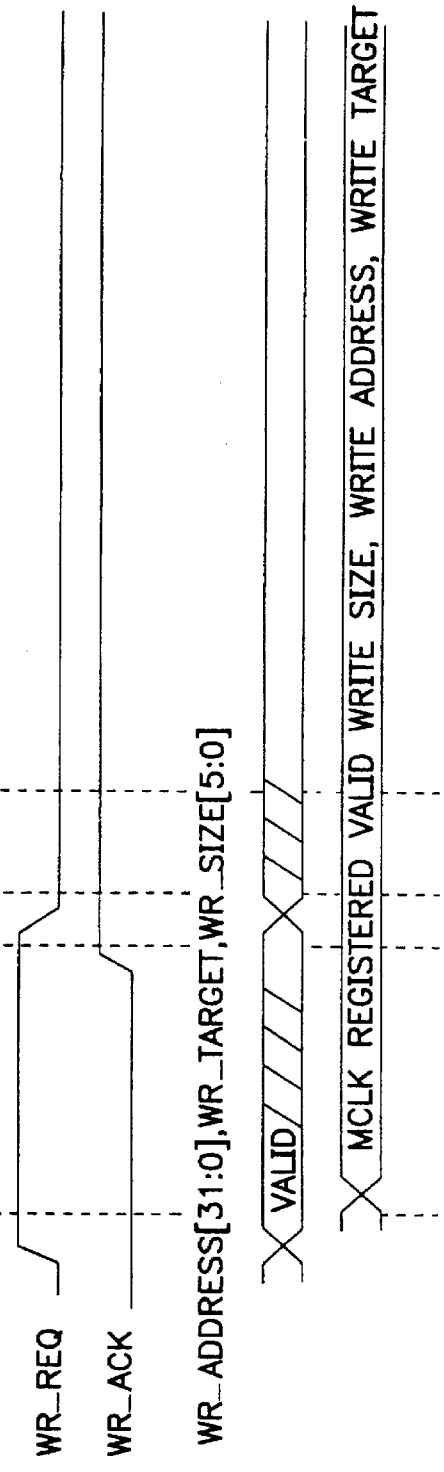

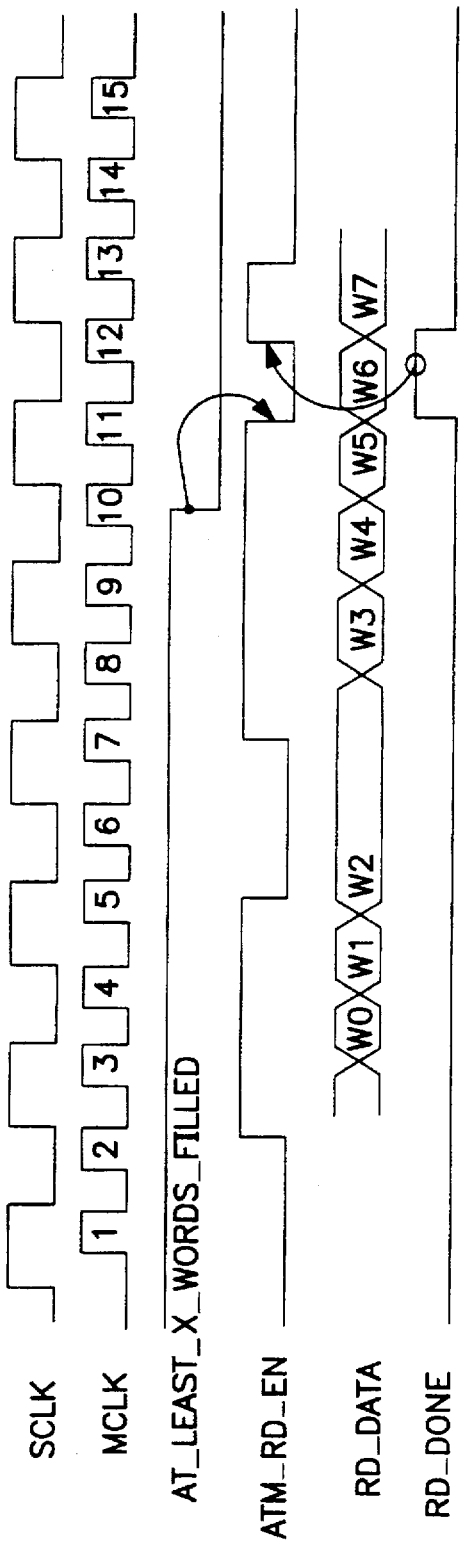
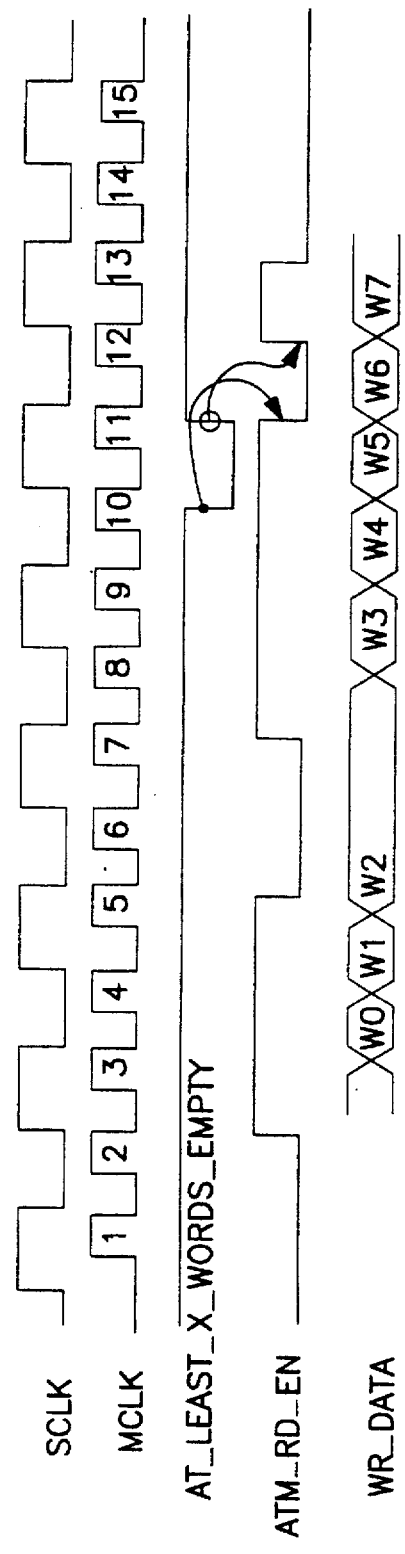

APPARATUS AND METHOD FOR PROVIDING A GENERIC INTERFACE BETWEEN A HOST SYSTEM AND AN ASYNCHRONOUS TRANSFER MODE CORE FUNCTIONAL BLOCK

BACKGROUND OF THE INVENTION

1. Field of the Invention

The present invention relates generally to the field of computer systems and, in particular, to a method and apparatus for providing a generic input/output interface to any Input/Output bus between a host computer system and an Asynchronous Transfer Mode (ATM) network interface Core functional block.

2. Description of the Related Art

ATM technology is emerging as the preferred technology for sending information at very high speeds between a transmission point and one or more receiving points. An ATM system facilitates the transmission of data over such a network by defining a set of "data connections" in which each connection represents a virtual circuit having a particular source and destination and an associated data transmission rate.

One particular implementation of an ATM system, shown in FIG. 1a, employs a Cell Interface block configured to implement a Universal Test and Operational Physical Interface (UTOPIA) protocol. A network interface circuit typically cooperates with the cell interface block to transfer data between the host computer and the other computers in the network. For transmission of cells to the ATM Cell Interface, multiple packets of data are accessed over an Input/Output (IO) Bus and provided to a System and ATM Layer Core (Core) where the data is segmented and then transmitted to the ATM Cell Interface (i.e., Utopia). For transmission of packets to the host device, the Cell Interface block first receives cells from the ATM Cell Interface (Utopia) and then forwards the cells to the Core for reassembly into packets before transferring the packets to the host device or another local area network.

In the implementation of Figure 1a, all transactions within the ATM Core functional block are driven by the System IO bus clock. Since the ATM Cell Interface (Utopia) receives data from the ATM core at the same IO clock, the link rate of the device data transmission between the host system and the ATM Cell Interface (Utopia) is unnecessarily limited.

In addition, the Core in this conventional circuit can only interact with a specific System IO bus, i.e., the System IO bus it is configured to interface with, since the Core is driven by the System IO bus clock. For example, if an interface is configured to interact with an S-Bus, it will have to be redefined for supporting a faster bus such as the PCI bus. This results in inflexibility and overall inefficiency since the Core is then dependent on the configuration of the IO block it is interfaced to. In addition, this conventional arrangement does not provide for pipelining of the Core transmit load and receive unload DMA requests. Furthermore, in using this arrangement, the Core has to wait for the TX FIFO to be completely full or for the RX FIFO to be completely empty before transmitting data or receiving data to or from the media. As a result, the IO bus bandwidth is not fully utilized.

FIG. 1b illustrates another conventional approach in providing an interface between a host system and an ATM Core functional block. This conventional circuit attempts to solve the problem existing in the circuit of FIG. 1a by providing synchronization of the signals driving the Core to the clock driving the IO bus, as shown in FIG. 1b. However, this approach is complicated since all control handshake, data handshake and the data transfer rates have to be correlated to the IO bus clock. In addition, it utilizes clock synthesizing logic to provide a fast enough clock to Utopia so as not to limit link rate. Moreover, this approach restricts the application of the Core to a specific IO bus. Like the circuit of Figure 1a, this conventional circuit does not provide for pipelining of the Core transmit load and receive unload DMA requests. In addition, in this conventional approach, the Core has to wait for the TX FIFO to be completely full or for the RX FIFO to be completely empty before transmitting data or receiving data to or from the media. As a result, the IO bus bandwidth is not fully utilized with this approach either.

Accordingly, there is an additional need in the technology to provide a system for synchronizing the IO clock and the Core clock which facilitates ease of system design and Core logic re-usability, and which provides for pipe lining of the Core transmit load and receive unload DMA requests, so that utilization of the IO bandwidth can be maximized.

BRIEF SUMMARY OF THE INVENTION

A generic Input/Output interface between an IO block and a System and ATM Layer Core on a network interface circuit is provided. The GIO interface includes parallel DMA read and write control handshake signal lines; parallel DMA read and write data handshake signal lines which operate independently from the read and write control handshake signal lines; parallel DMA read and write data signal lines; and a single clock signal line.

The design and definition of the GIO interface facilitates maximum utilization of the IO bandwidth, for example, by allowing back-to-back DMA requests over the IO bus. It also allows several requests to be queued across the GIO interface at the same time, in each read and write direction, and permits the Core to read or write data in increments rather than having to wait for the DMA buffer to be completely filled or emptied out.

In addition, the GIO interface utilizes a fixed clock for driving the transmit and receive data path. The clock is used for the entire Core and IO synchronization is pushed over to the IO block. By thus referencing all transactions to the clock driving the Core, the Core remains unchanged for different embodiments of the network interface circuit which interface to different host computer systems and busses. In addition, when the Core is 622 Mbps duplex-ready, it can be coupled to any IO block to achieve a transmission data rate of up to 622 Mbps duplex.

BRIEF DESCRIPTION OF THE DRAWINGS

FIG. 4b is a block diagram which illustrates in detail the signal lines shown in FIG. 3a.

FIGS. 5a and 5b are timing diagrams illustrating the timing cycles for the read and write control handshake signals between the System-IO Interface 20 and the Core 22, respectively.

FIGS. 6a and 6b and timing charts illustrating the timing cycles of the read data handshake signals shown in FIGS. 4a and 4b.

DETAILED DESCRIPTION OF THE INVENTION

Figure 1A:
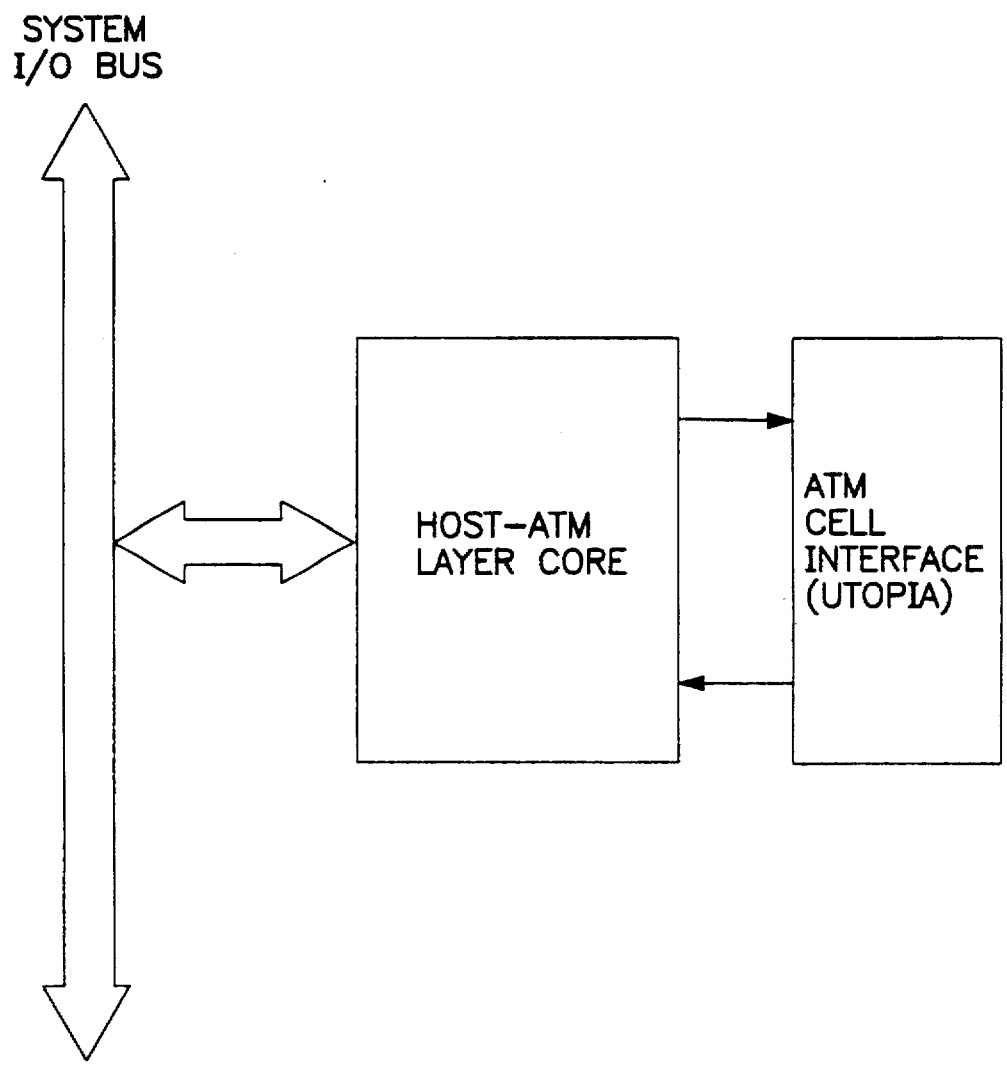
FIG. 1a illustrates one conventional approach in providing an interface between a host system and an ATM Core functional block.
Figure 1B:
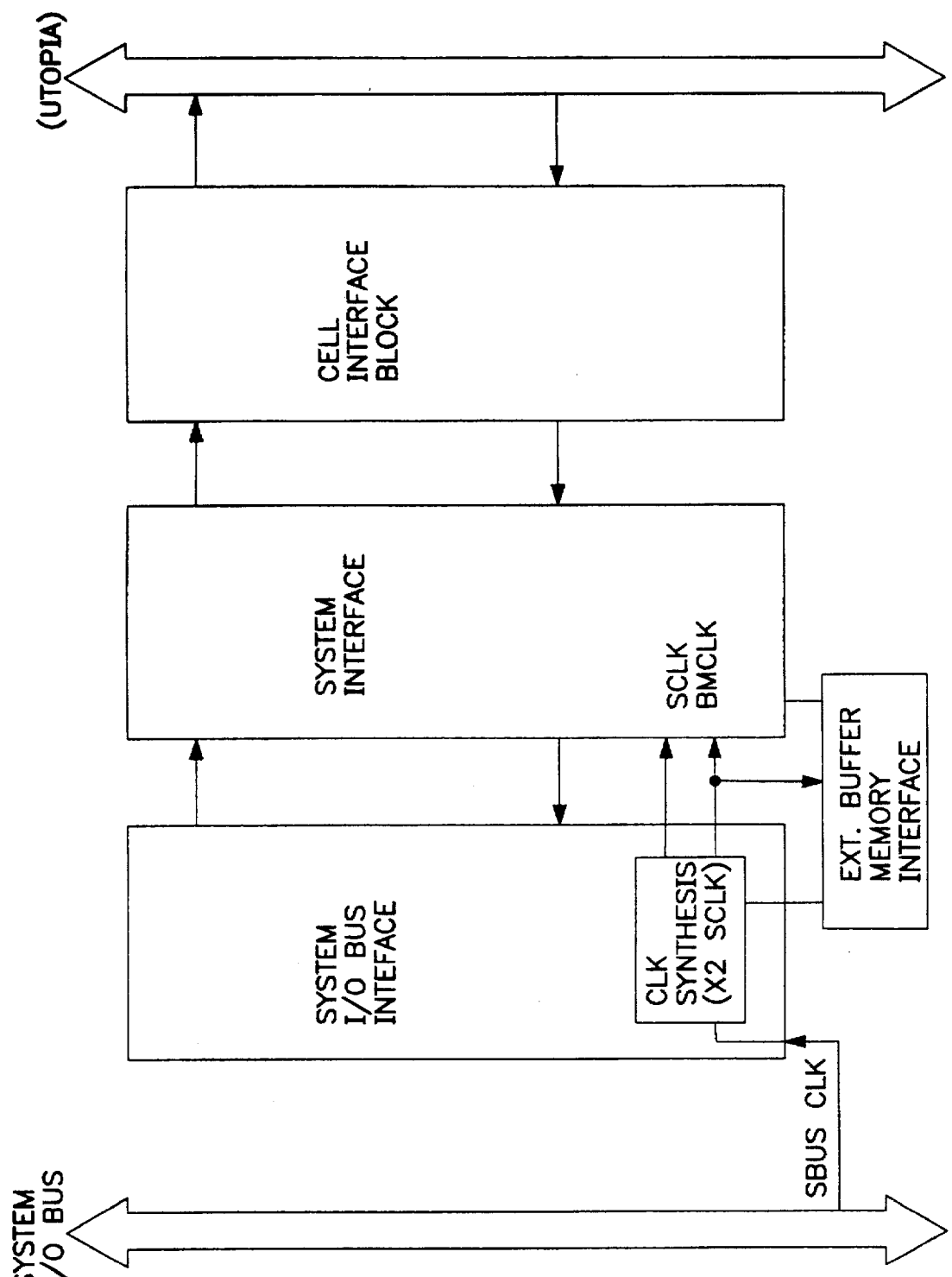
FIG. 1b illustrates another conventional approach in providing an interface between a host system and an ATM Core functional block.
Figure 2:
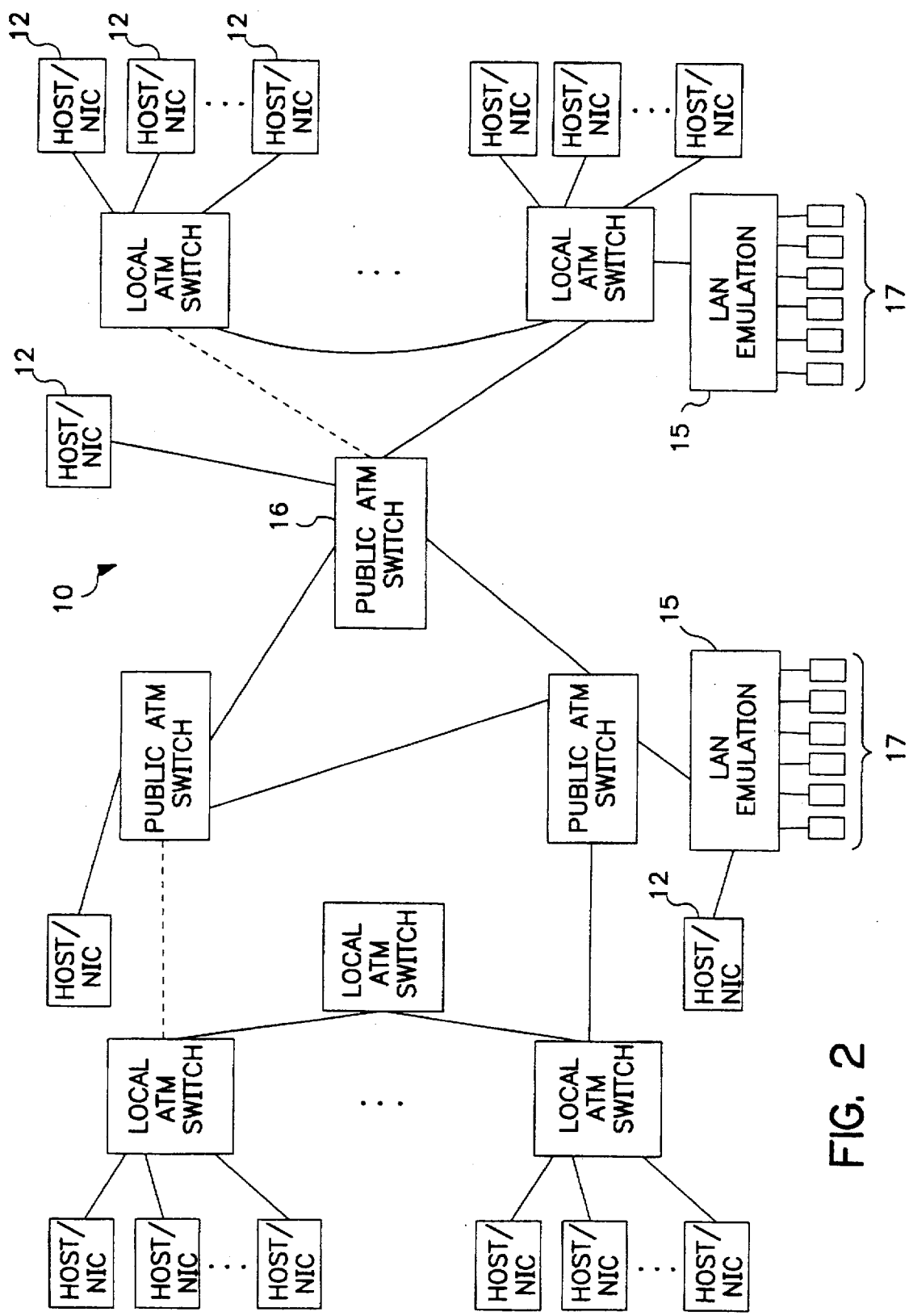
FIG. 2 illustrates an exemplary computer system network incorporating an asynchronous transfer mode network interface circuit which utilizes the method and apparatus of data transfer coordination of the present invention.

FIG. 2 illustrates an exemplary computer system network incorporating the ATM network interface circuit which utilizes the method and apparatus of data transfer protocol of the present invention. The computer system network 10 includes host computer systems (not shown) which incorporate one or more of the ATM network interface circuits (NIC) 12. The NICs 12 are coupled through a local ATM switch 14 to a public ATM switch 16 to enable asynchronous transfer of network data between host computer systems coupled to the network 10. Alternately, the NICs 12 can be coupled directly to the public ATM switch 16. As shown in FIG. 2, the computer system network 10 may also include computer systems which incorporate the use of a Local Area Network ("LAN") emulation 15 which serves as a gateway for connecting other networks such as Ethernet or token ring networks 17 which utilize the ATM network as a supporting framework.

Figure 3:
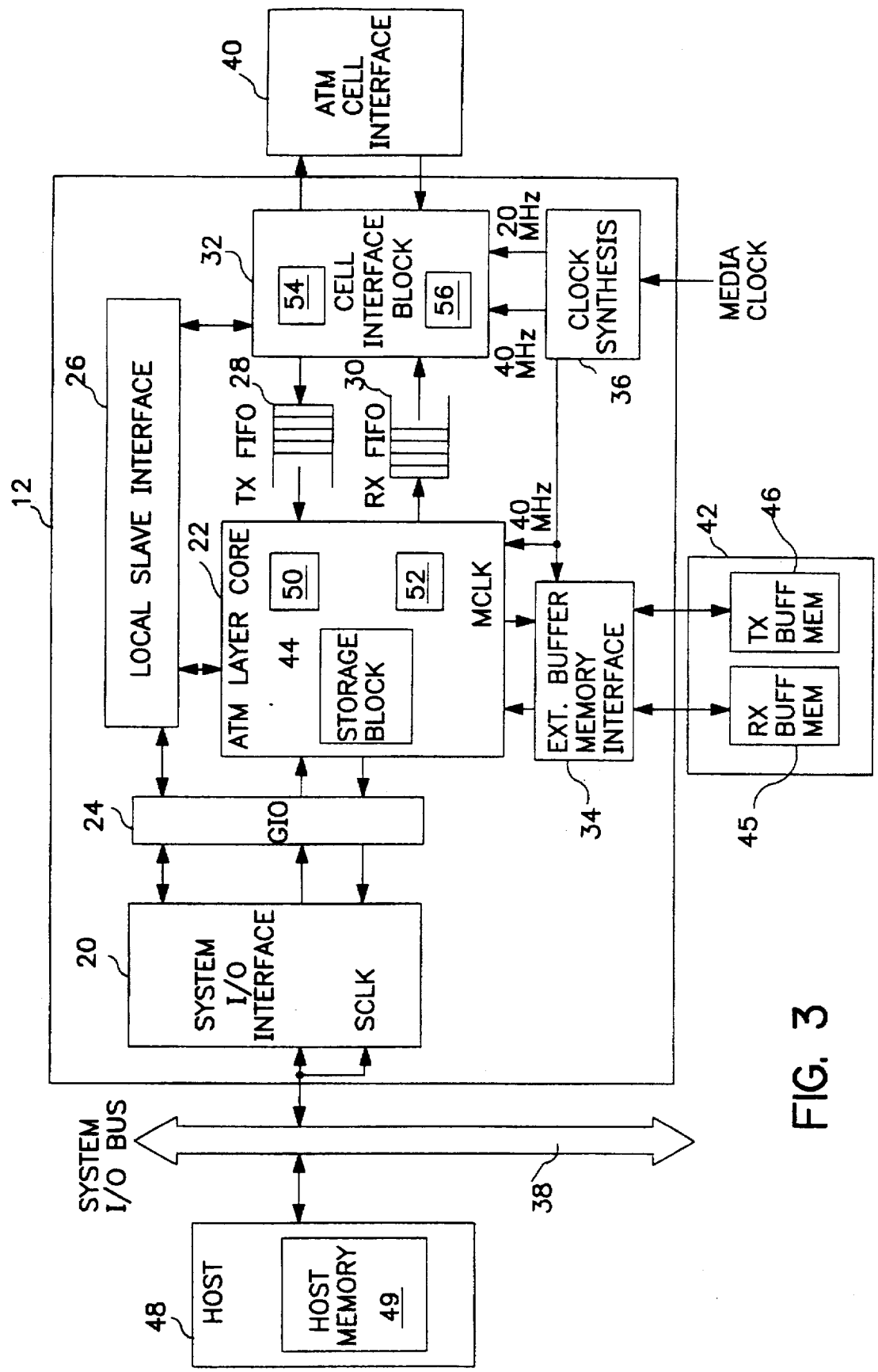
FIG. 3 is an overall system diagram illustrating the architecture of the asynchronous transfer mode network interface circuit which utilizes the method and apparatus of data transfer coordination in accordance with one embodiment of the present invention.

FIG. 3 is a simplified system diagram illustrating the architecture of the ATM NIC 12 which utilizes the method and apparatus of data transfer coordination in accordance with one embodiment of the present invention. The ATM NIC 12 interfaces a host computer system 48 coupled through System-IO bus 38 to the ATM Cell Interface 40 operating in accordance with the ATM protocol.

The ATM NIC 12 shown includes a System-IO interface 20, a Generic Input/Output ("GIO") interface 24, a System and ATM Layer Core 22, a Local Slave interface 26, a transmit (TX) FIFO 28, a receive (RX) FIFO 30, a Cell Interface block 32, an External Buffer Memory Interface 34 and a clock synthesis circuit 36.

Together, the elements 20–36 of NIC 12 cooperate to transfer data between the host computer 48 and the other computers in the network through multiple, dynamically allocated channels in multiple bandwidth groups. Collectively, the elements of the network interface circuit 12 function as a multi-channel intelligent direct memory access (DMA) controller coupled to the System-IO bus 38 of the host computer system 48. In one embodiment, multiple transmit and receive channels are serviced as virtual connections utilizing a full duplex 155/622 Mbps (Mega bits per second) physical link. Multiple packets of data, subscribed to different channels are accessed over the System-IO bus 38 to the external buffer memory 42, via the External Buffer Memory Interface 34, are segmented by the Core 22 into transmit cells for transmission to the ATM Cell Interface 40 through Cell Interface block 32. The Core 22 also comprises reassembly logic to facilitate reassembly of the received cells to packets.

The TX and RX buffers, such as TX and RX FIFOS 28 and 30, coupled between the Core 22 and the Cell Interface block 32, are used to stage the transmit and receive ATM cells of the transmit and receive packets respectively. The Cell Interface block 32 transmits and receives cells to or from the ATM Cell Interface 40 of the network, driven by clock signals provided by Clock Synthesis Circuit 36. Preferably the ATM Cell Interface 40, and therefore the Cell Interface block 32, conforms to the Universal Test and Operations Physical Interface for ATM ("UTOPIA") standard, as described by the ATM Forum specification. Thus, in one preferred embodiment, the ATM Cell Interface 40 is UTOPIA. To conform to the UTOPIA specification, the clock synthesis circuit 36 provides either a clock signal of 20 MHz or 40 MHz to enable the Cell Interface block 32 to support an 8 bit stream at 20 MHz for 155 Mbps or a 16 bit stream at 40 MHz for a 622 Mbps data stream.

In the present embodiment, the Cell Interface block 32 receives 52-byte data cells each having a 4-byte cell header and a 48-byte payload from the RX FIFO 30. The Cell Interface block 32 inserts a header checksum as a fifth byte to the cell header into each cell prior to providing the 53-byte data cell to the ATM Cell Interface 40. Conversely, when the Cell Interface block 32 receives cells from the ATM Cell Interface 40, it examines the header checksum in the fifth byte of each cell to determine if the checksum is correct. If so, the byte representing the checksum is stripped from the cell and the 52 byte data cell is forwarded to the TX FIFO 28, otherwise the entire cell is dropped.

The System-IO Interface 20 and GIO interface 24 insulate the host computer system 48 from the specifics of the transfer to the ATM Cell Interface 40. Furthermore, the Core 22 is insulated from the specifics of the system bus 38 and host specifics. In the present preferred embodiment, the System Bus is an S-Bus, as specified in the Institute of Electronics and Electrical Engineers ("IEEE") standard 1496 specification. The System-IO Interface 20 is configured to communicate in accordance with the specifications of the System-IO bus 38, in the present illustration, the S-Bus, which transfers data in 32-bit and 64-bit formats. It is contemplated that the System-IO Interface 20 can be configured to conform to different host computer system busses. The System-IO Interface 20 is also configured to transfer and receive data in accordance with the protocols specified by the GIO interface 24.

The GIO interface 24 provides a singular interface through which the Core 22 communicates with the host computer. Thus, the Core 22 does not change for different embodiments of the NIC 12 which interface to different host computer systems and busses. The GIO interface 24 utilizes a 40 MHz clock provided by clock synthesis circuit 36 for driving the transmit and receive data path so as to obtain a 622 Mbps full duplex operation. The 40 MHz clock is used for the entire Core 22 and IO synchronization is pushed over to the IO block (not shown) in the System-IO Interface 20. By thus fixing the clock driving the Core 22, the Core 22 remains fixed for different embodiments of the NIC 12 and only the System-IO Interface 20 has to be altered for interfacing with a different System-IO bus 38.

Three memory sub-systems are associated with the operation of the NIC 12. These include the host memory 49 located in the host computer system 48, the external buffer memory 42 external to the NIC 12 and storage block 44 located in the Core 22. The NIC 12 manages two memory areas: the external buffer memory 42 and the storage block 44. The external buffer memory 42 contains packet data for all transmit and receive channels supported by the NIC 12. The storage block 44 contains DMA state information for transmit and receive channels and pointers to data structures in host memory 49 for which DMA transfers are performed. The storage block 44 also contains the data structure specifics to manage multiple transmit and receive buffers for packets in transition between the host 48 and the ATM Cell Interface 40.

The host computer system 48 includes host memory 49 which contains data packets and pointers to the packets being transmitted and received. As noted previously, the NIC 12 also shields the cell delineation details of asynchronous transfer from the applications running on the host computer system. For present purposes, it is assumed that software running on the host computer system 48 manage transmit and receive data using wrap around transmit and receive rings with packet interfaces as is well known in the art.

Figure 4A:
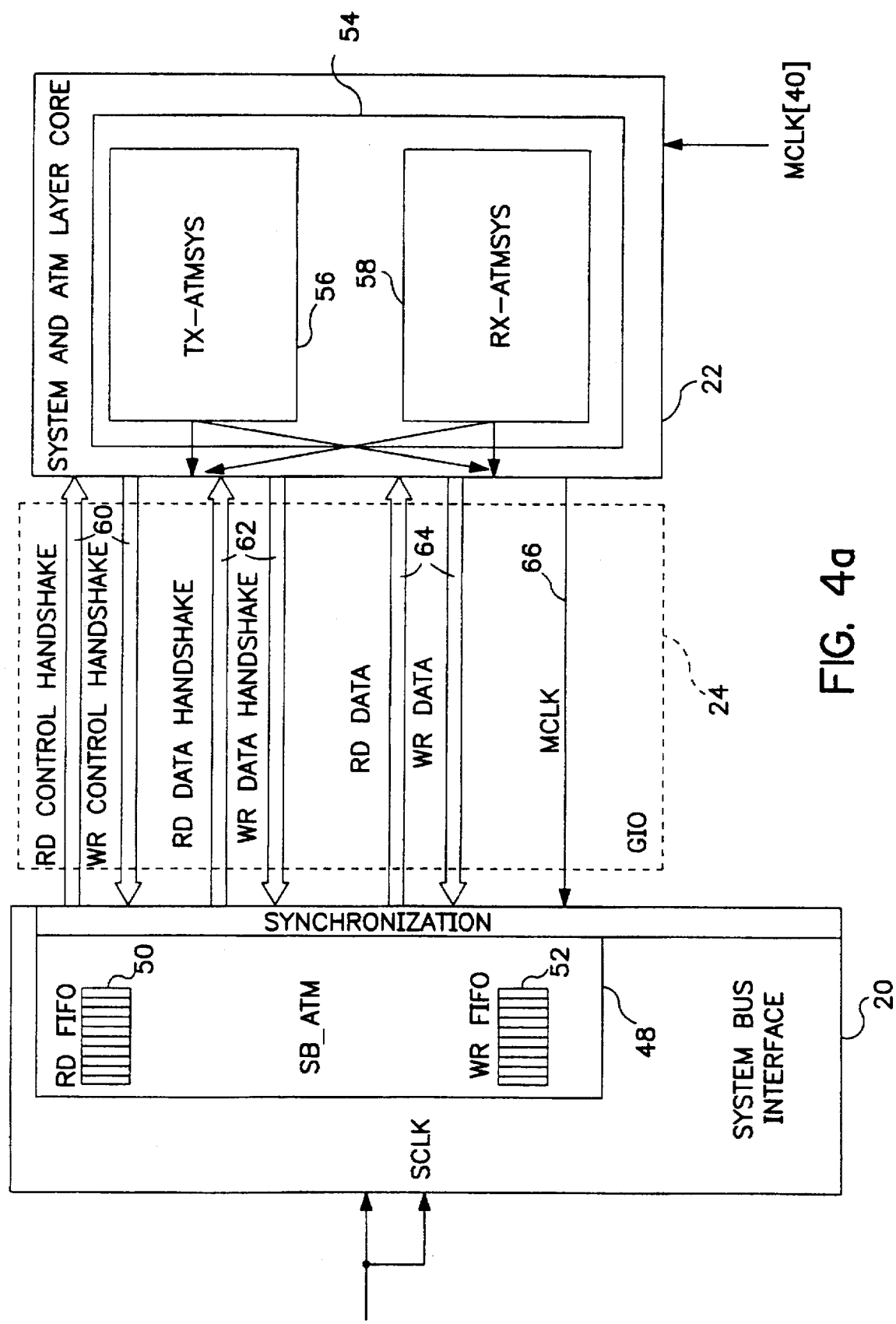
FIG. 4a is a detailed block diagram illustrating the System-IO interface 20, the Generic Input/Output ("GIO") interface 24, and the Core 22 of FIG. 3, in accordance with one embodiment of the present invention.
Figure 4B:
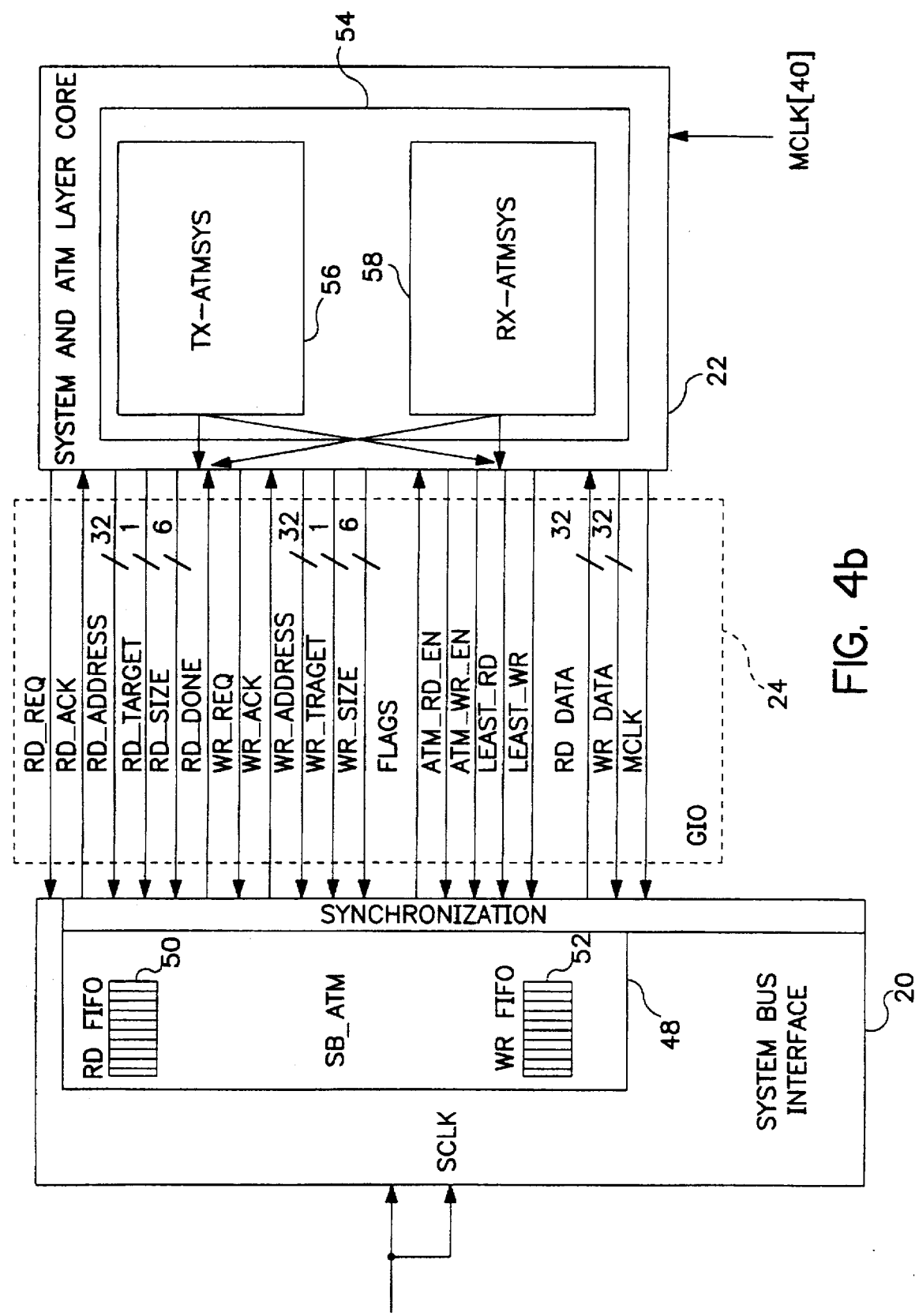

FIGS. 4a and 4b are detailed block diagrams illustrating the System-IO interface 20, the GIO interface 24, and the Core 22 of FIG. 3, in accordance with one embodiment of the present invention. As shown, the System-IO interface 20 includes a System-IO/ATM (SB_ATM) block 48 which consists of two 14-location deep, 64-bit wide wrap-around FIFOs—a Read (RD) FIFO 50 and a Write (WR) FIFO 52. The RD FIFO 50 and WR FIFO 52 respectively support more than one 64-byte read and write data bursts requested by the Core 22, which eventually result in read and write accesses across the System-IO bus 38.

The Core 22 includes an ATM_SYS block 54 which initiates simultaneous read and write requests via TX_ATMSYS circuit 56 or RX_ATMSYS circuit 58, to the SB_ATM block 48. When thus initiated, the SB_ATM block 48 performs arbitration to select the next request to honor. Read and write addresses, sizes and targets are separately provided by the Core 22 at the same time the request is issued. The addresses, sizes and targets can be dispatched as quickly as one clock cycle from the time they were issued, as will be discussed in detail in the following sections.

The GIO interface 24 of the present invention comprises 4 groups of signal lines as shown in FIG. 4a, namely, (1) the parallel DMA read and write control handshake signal lines 60; (2) the parallel DMA read and write data handshake signal lines 62 which operate independently from the read and write control handshake signal lines 60; (3) the parallel DMA read and write data signal lines 64; and (4) a single clock signal line 66. The circuits for generating and receiving the signals 60 are disclosed in co-pending U.S. patent application No. 08/499,199 titled "A Method and Apparatus for Allowing Packet Data to be Separated Over Multiple Bus Targets" filed on Jul. 7, 1995 by the same inventors and assigned to the same assignee as the present application. The subject matter in U.S. patent application No. 08/499,199, now U.S. Pat. No. 5,550,055, is hereby incorporated by reference. The circuits for generating and receiving the signals 62 are disclosed in co-pending U.S. patent application No. 08/498,618 titled "Method and Apparatus for Dynamically Calculating Degrees of Fullness of a Synchronous FIFO" filed on Jul. 7, 1995, which was assigned to the same assignee as the present application. The subject matter in U.S. patent application No. 08/498,618 is hereby incorporated by reference. The circuits for generating and receiving signals 64 and 66 may be implemented by one skilled in the art.

The parallel DMA read and write control handshake signals provided via signal line 60 permit simultaneous read and write DMA requests to be sent to the SB_ATM block 48 in the System-IO Interface 20 from the ATM_SYS block 54. This in turn permits the SB_ATM block 48 to perform arbitration to allow one of the requests to be asserted on the System-IO bus 38 at a time.

The parallel DMA read and write data handshake signals provided via signal line 62 are synchronous to the Core 22 clock domain and indicate in real time how full or empty the RD FIFO 50 or WR FIFO 52 is, rather than indicating if the FIFOs 50 or 52 are totally full or totally empty. This finer granularity of flags allow faster data flow across the GIO interface 24. The data handshake signals 62 are independent of the control handshake signals 60 and thus permit smaller DMA requests, such as descriptor updates, to be provided along with the larger (64 byte) DMA requests, resulting in improved throughput.

The DMA read and write data is provided via a duplex, 32-bit signal line 64 to preserve the full bandwidth of the external buffer memory interface 34 so as to facilitate duplex 622 Mbps segmentation and reassembly. A single clock signal is provided via signal line 66. In one embodiment, this clock signal is 40 MHz.

FIG. 4b illustrates in detail the four signal lines of FIG. 4a. The parallel DMA read and write control handshake signal lines 60 include the rd_req, the rd_ack, the rd_address, the rd_target, the rd_size, the rd_done, the wr_req, the wr_ack, the wr_address, the wr_target and the wr_size signal lines. The rd_req and wr_req signal lines provide signals from the ATM_SYS block 54 to the SB_ATM block 48, and the signals thus provided respectively initiate a read and write request on the rising edge of the signal. The rd_ack and wr_ack signal lines each provide signals from the SB_ATM block 48 to the ATM_SYS block 54, which are asserted to indicate that the rd_req and the wr_req signals are respectively granted and the ATM_SYS block 54 is free to continue its functions and may change the read or write address, size, or targets thereafter.

The rd_address and the wr_address signal lines each provide signals from the ATM_SYS block 54 to the SB_ATM block 48, which indicate the memory addresses to be used during the read and write transactions respectively. The rd_target and wr_target signal lines provide signals from the ATM_SYS 54 to the SB_ATM block 48, which indicate whether the IO bus target device for the read and write request, respectively, is the slave card or the host memory. The host memory and slave card are both DMA bus target devices. The slave card is an S-bus or IO bus device coupled to the System IO bus 38, which serves as a slave. One embodiment of the slave card is described in co-pending U.S. patent application No. 08/499,199 titled "A Method and Apparatus for Allowing Packet Data to be Separated Over Multiple Bus Targets" filed on Jul. 7, 1995 by the same inventors and assigned to the same assignee as the present application, now U.S. Pat. No. 5,550,055. The subject matter in U.S. patent application No. 08/499,199, now U.S. Pat. No. 5,550,055, is hereby incorporated by reference. When set to 0, it indicates that the target device is the host memory, when reset to 1, it indicates that the target device is the slave card. The rd_size and wr_size signal lines provide signals from the ATM_SYS 54 to the SB_ATM block 48 which indicate the raw size in byte units, of the data required by the read and write request, respectively. Finally, the rd_done signal line provides a signal from the SB_ATM block 48 to the ATM_SYS block 54 to indicate to the ATM_SYS block 54 that the last word or doubleword has been written into the RD FIFO 50 and that the ATM_SYS block 54 can read off the rest of the data without looking at the FIFO flag. This is to prevent the last word(s) of data from lingering in the RD FIFO 50 if there is no new DMA read scheduled for updating the FIFO flags.

The parallel DMA read and write data handshake signals provided via signal line 62 include the flags, the atm_rd_en, atm_wr_en, last_rd and last_wr signal lines. The flags signal line includes an at_least_x_words_filled flag, where x is an integer, to the ATM_SYS block 54 that it can start reading data from RD FIFO 50 if desired. The flags signal line also includes an at_least_x_words_empty signal line to signal ATM_SYS block 54 that it can start writing data into WR FIFO 52 if desired. These flags are mclk-based. The atm_rd_en and atm_wr_en signal lines respectively assert a signal to signify to the RD FIFO 50 and WR FIFO 52 that it is reading and writing data, respectively. The duration of each of the signal indicates how many 32-bit words are to be written. However, there is no restriction on the number of words to be written. The last_rd and last_wr signals are provided by the SB_ATM block 48 across the GIO interface 24 to allow 64 bit-wide IO block data path implementation. Where on a 32-bit wide data path is implemented, the last_wr and last-rd signal lines can be left unconnected.

Figure 5C:
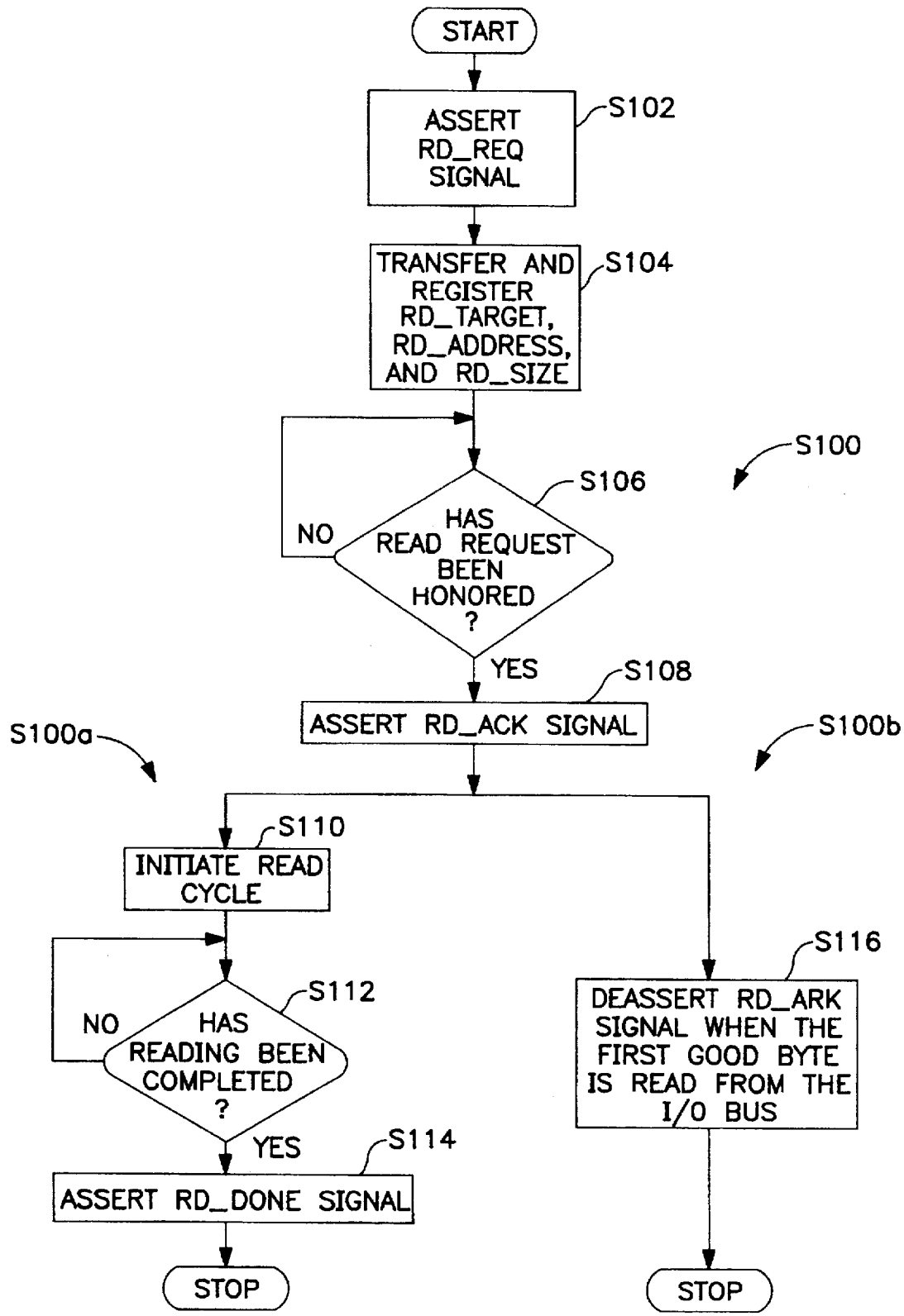
FIGS. 5c and 5d are flow charts illustrating the read control handshaking processes shown in FIGS. 5a and 5b respectively.
Figure 5D:
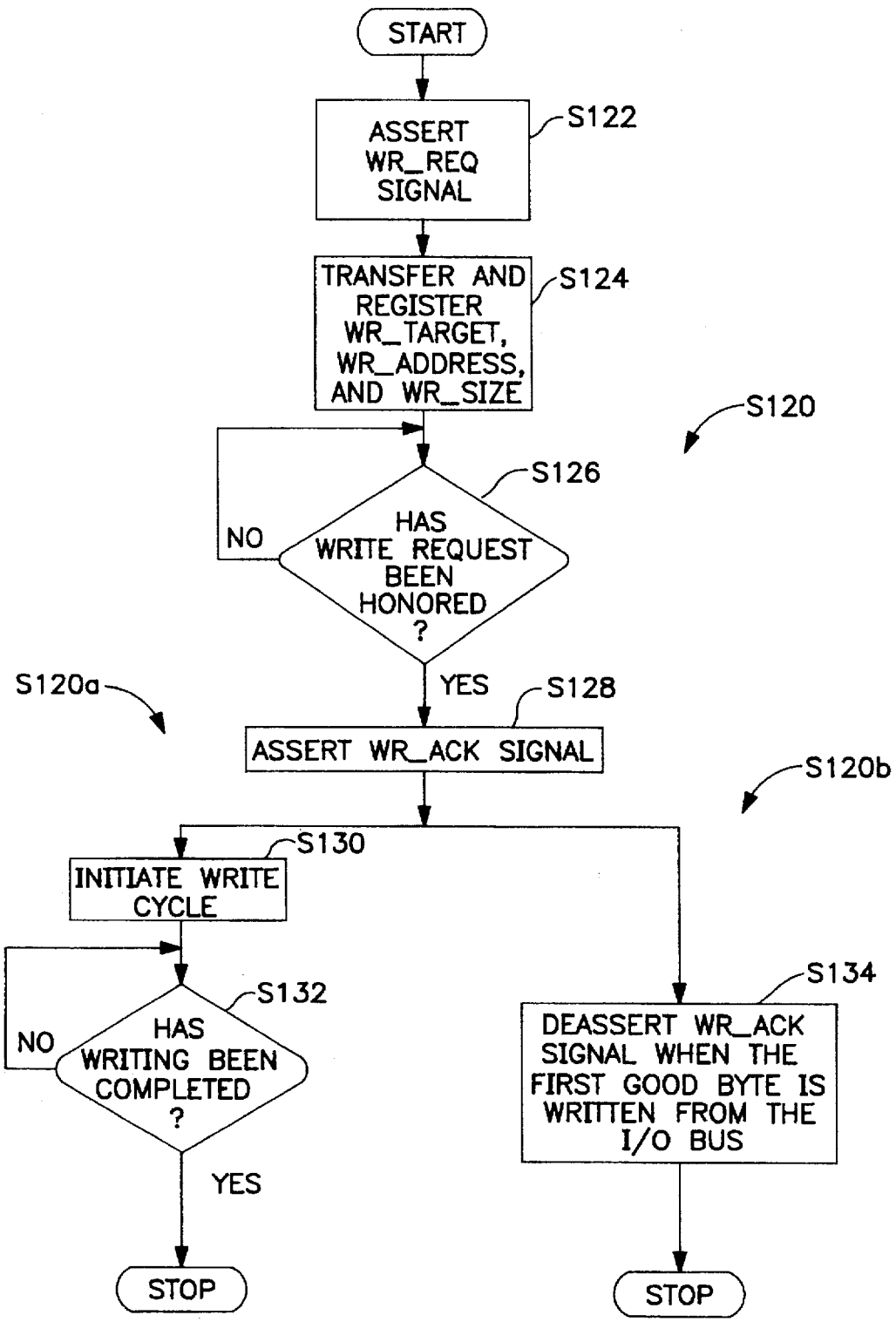

FIGS. 5a and 5b are timing diagrams illustrating the timing cycles for the read and write control handshake signals between the System-IO Interface 20 and the Core 22. FIGS. 5c and 5d are flow charts illustrating the read control handshaking processes shown in FIGS. 5a and 5b respectively. As shown in FIG. 5a, the rd_req signal is asserted via the rd_req signal line when there is a request to read data. Since the GIO Interface 24 has to service multiple read and write requests, fair arbitration of these requests has to be performed to allow one of the requests to be asserted on the System-IO bus 38 at a time. The apparatus and method described in pending U.S. patent application No. 08/499,199 titled "A Method and Apparatus for Allowing Packet Data to be Separated over Multiple Bus Targets" filed on Jul. 7, 1995, which was assigned to the assignee of the present invention, and which is incorporated herein, now U.S. Pat. No. 5,550,055, describes one embodiment of such arbitration.

In the event that a read request is honored upon completion of arbitration, the rd_ack signal is asserted, as shown in FIG. 5a. The rd_target, rd_address and rd_size signals from the ATM_SYS block 54 are registered with the SB_ATM block 48 one clock cycle after rd_req is asserted. This is done so that the ATM_SYS block 54 can then be released to process other requests without waiting for or be held up by the acknowledgment of read or IO arbitration. The read cycle is initiated in the meantime. At the time the first good byte or word is written into the RD FIFO 50, the rd_ack signal is deasserted. This allows the ATM_SYS block 54 to assert another rd_req, if there is one pending. When reading is done, the rd_done signal is asserted by the SB_ATM block 48.

The read control handshake process will now be described with reference to FIG. 5c. Beginning from a start state, the process S100 proceeds to process step S102 where the rd_req signal is asserted. It then proceeds to process step S104 where the rd_target, rd_address and rd_size signals from the ATM_SYS block 54 are transferred and registered with the SB_ATM block 48 one clock cycle after rd_req is asserted. The process S100 proceeds to decision step S106, where it queries if a read request has been honored. If not, the process S100 proceeds back to decision step S106, to continue monitoring whether a read request has been honored. If a read request has been honored, the process S100 proceeds to process step S108 where the rd_ack signal is asserted. At this juncture, the process S100 proceeds in two parallel operations, represented by processes S100a and S100b. Advancing from process step S108, process S100a proceeds to process step S110, where the read cycle is initiated. It then proceeds to decision step S112 where it queries if reading has been completed. If not, the process S100a proceeds back to decision step S112. If reading has been completed, the process S100a proceeds to process step S114, where the rd_done signal is asserted. The process S100a then terminates.

Advancing from process step S108, the process S100b proceeds to process step S116, where the rd_ack signal is deasserted when at the first good byte or word is written into the RD FIFO 50. This allows the ATM_SYS block 54 to assert another rd_req, if there is one pending. The process S100b then terminates.

The write control handshake process S120 will now be described with reference to FIG. 5d. Beginning from a start state, the process S120 proceeds to process step S122 where the wr-req signal is asserted. It then proceeds to process step S124 where the wr_target, wr_address and wr_size signals from the ATM_SYS block 54 are transferred and registered with the SB_ATM block 48 one clock cycle after the wr_req is asserted. The ATM_SYS block 54 can then be released to process other requests without waiting for or be held up by the wr_ack signal or IO arbitration. The process S120 proceeds to decision step S126, where it queries if a write request has been honored. If not, the process S120 proceeds back to decision step S126 to continue monitoring if a write request has been honored. If a request has been honored, the process S120 proceeds to process step S128, where the wr_ack signal is asserted. At the juncture, the process S120 proceeds in two parallel operations, represented by processes S120a and S120b. Advancing from process step S128, the process S120a proceeds to process step S130, where the write cycle is initiated. The process S120a then proceeds to decision step S132, where it queries if writing has been completed. If not, the process S120a proceeds back to decision step S132 to continue monitoring for the completion of the writing process. If writing has been completed, the process S120a terminates.

Advancing from process step S128, the process S120b proceeds to process step S134, where the wr_ack signal is deasserted at the time the first good byte or word is written into the WR FIFO. This allows the ATM_SYS block 54 to assert another wr_req, if there is one pending. The process S120 then terminates.

In the event that a write request is honored upon completion of arbitration, the wr_ack signal is asserted, as shown in FIG. 5b. The wr_target, wr_address and wr_size signals from the ATM_SYS block 54 are registered with the SB_ATM block 48 one clock cycle after the wr_req is asserted. The ATM_SYS block 54 can then be released to process other requests without waiting for or be held up by the wr_ack signal or IO arbitration. The write cycle is initiated in the meantime. At the time the first good byte or word is written into the WR FIFO, the wr_ack signal is deasserted. This allows the ATM_SYS block 54 to assert another wr_req, if there is one pending.

The write control handshake process S120 will now be described with reference to FIG. 5d. Beginning from a start state, the process S120 proceeds to decision step S122, where it queries if a write request has been honored. If not, the process S120 proceeds back to decision step S122 to continue monitoring if a write request has been honored. If a request has been honored, the process S120 proceeds to process step S124, where the wr_ack signal is asserted. At the juncture, the process S120 proceeds in two parallel operations, represented by processes S120a and S120b. Advancing from process step S124, the process S120a proceeds to process step S126, where the write cycle is initiated. The process S120a then proceeds to decision step S128, where it queries if writing has been completed. If not, the process S120a proceeds back to decision step S128 to continue monitoring for the completion of the writing process. If writing has been completed, the process S120a terminates.

Advancing form process step S124, the process S120b proceeds to process step S130, where the wr_target, wr_address and wr_size signals from the ATM_SYS block 54 are transferred and registered with the SB_ATM block 48 one clock cycle after the wr_req is asserted. The ATM_SYS block 54 can then be released to process other requests without waiting for or be held up by the wr_ack signal or IO arbitration. The process S120b then proceeds to process step S132, where the wr_ack signal is deasserted at the time the first good byte or word is written into the WR FIFO. This allows the ATM_SYS block 54 to assert another wr_req, if there is one pending. The process S120 then terminates.

Figure 6C:
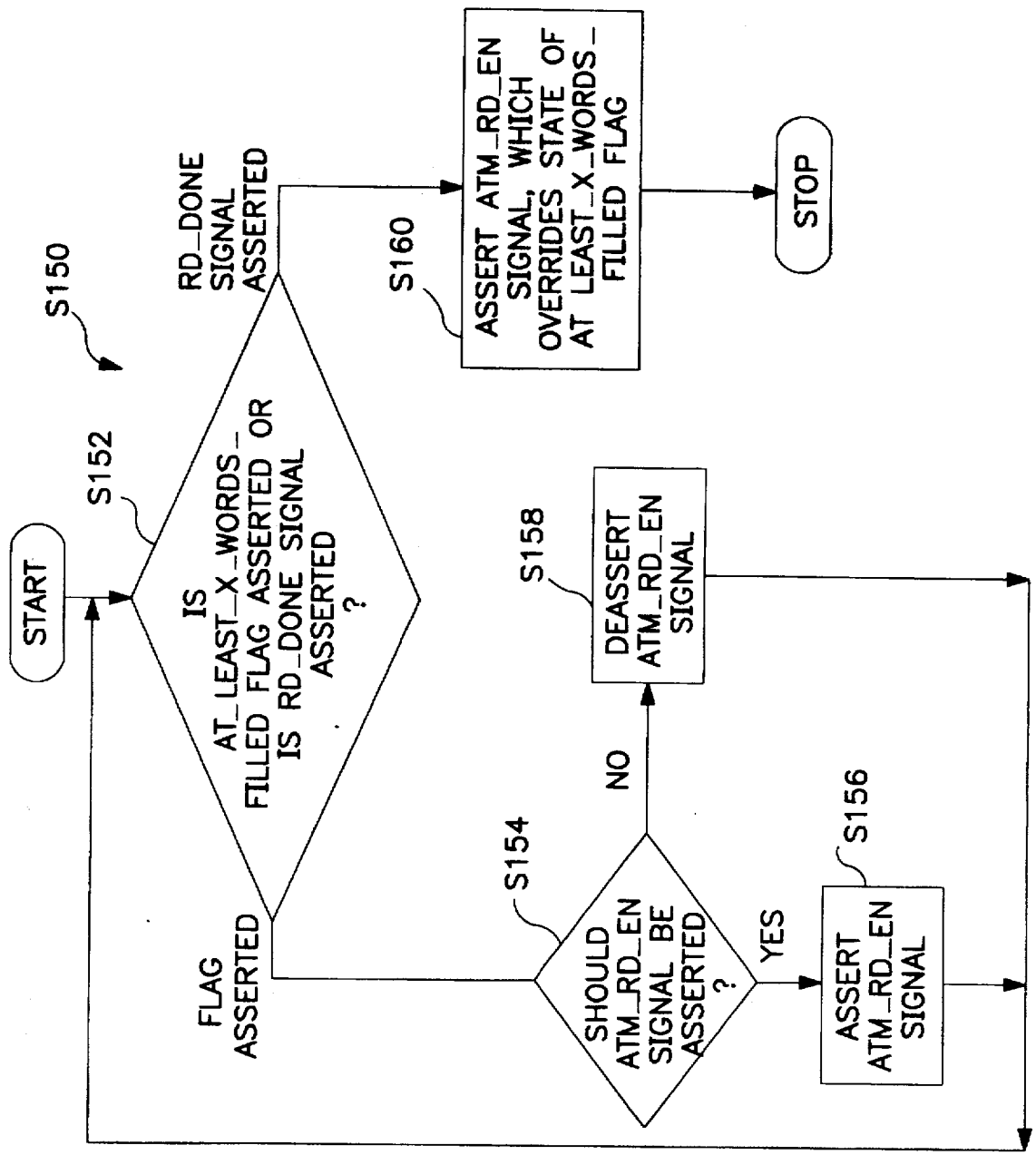
FIGS. 6c and 6d are flow charts illustrating the read and write data handshake processes shown in FIGS. 5a and 5b.
Figure 6D:
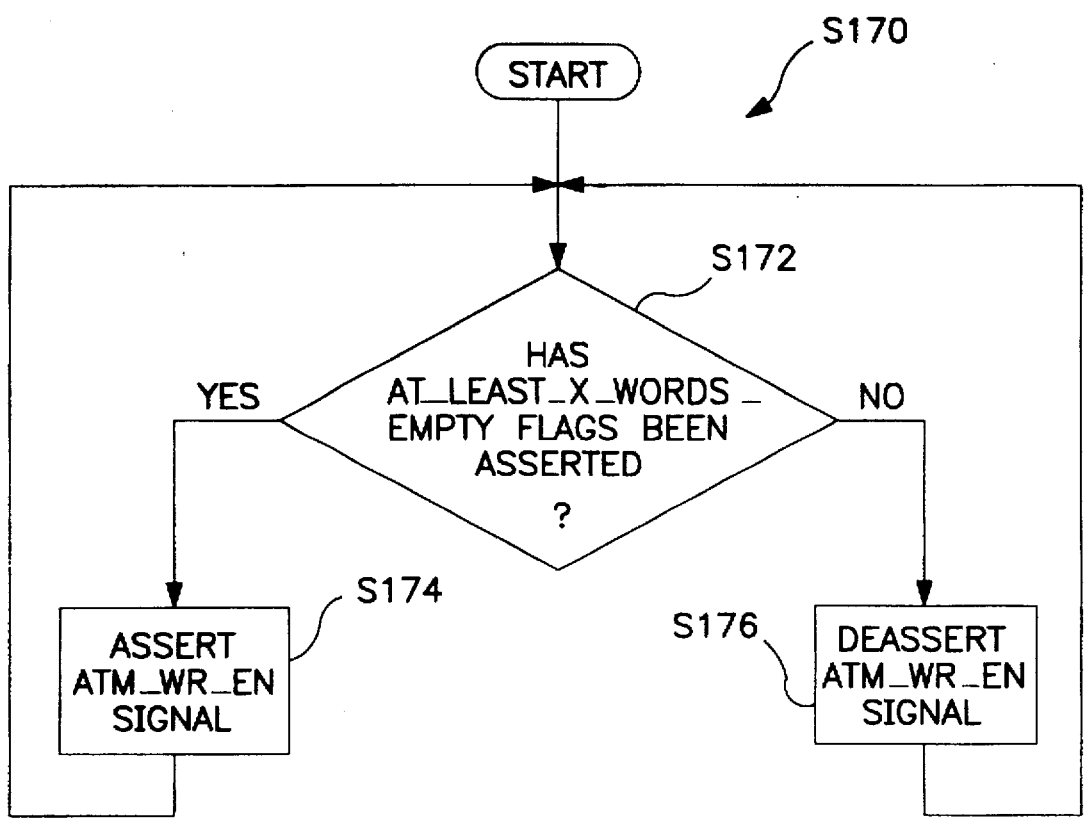

FIGS. 6a and 6b are timing charts illustrating the timing cycles of the read and write data handshake signals shown in FIGS. 4a and 4b. FIGS. 6c and 6d are flow charts illustrating the read and write data handshake processes shown in FIGS. 4a and 4b.

A discussion of the read data handshake cycle will now be discussed. As shown in FIG. 6a, the at_least_x_words_filled flag indicates at every mclk cycle the number (i.e., "x", where x is 2 words, 4 words, etc.) of storage locations in the RD FIFO 50 that are filled with valid data. Similarly, the at_least_x_words_empty flag indicates to ATM_SYS block 54 the number of empty storage locations in the WR FIFO 52 at every mclk cycle. The ATM_SYS block 54 determines when to assert the atm_rd_en signal based on either the assertion of the at_least_x_words_filled flag or the assertion of the rd_done signal. As shown, the ATM_SYS block 54 may assert the atm_rd_en signal as desired, so long as the at_least_x_words_filled flag is asserted. When the at_least_x_words_filled flag is deasserted in the tenth mclk cycle, the atm_rd_en signal is deasserted in the following (i.e., eleventh) mclk cycle. However, the assertion of the rd_done signal overrides the state of the at_least_x_words_filled flag. As shown, when the rd_done signal is asserted during the eleventh mclk cycle, when the at_least_x_words_filled flag is deasserted, the atm_rd_en signal is asserted in the following (i.e., twelfth) mclk cycle. In this manner, the rd_done signal may be used for the last few words in the RD FIFO 50 to be read, when there is no more System-IO bus 38 read activity to bring new words so that the at_least_x_words_filled flag would not be asserted.

The read data handshake process will now be discussed with reference to FIG. 6c. Beginning from a start state, the process S150 proceeds to process step S152, it determines whether to assert the atm_rd_en signal based on either the assertion of the at_least_x_words_filled flag or the assertion of the rd_done signal. If the at_least_x_words_filled flag is asserted, the process S150 proceeds to decision step S154, where queries if the atm_rd_en signal should be asserted. If so, the process S150 proceeds to process step S156, where the atm_rd_en signal is asserted, and the process S150 then returns to decision step S152. If the atm_rd_en is to be deasserted, the process S150 proceeds to process step S158, where the atm_rd_en signal is deasserted, upon which the process returns to decision step S 152.

If the rd_done signal has been asserted, the process S150 proceeds to process step S1760, where the atm_rd_en signal is asserted. In this manner, the rd_done signal may be used for the last few words in the RD FIFO 50 to be read, when there is no more System-IO bus 38 read activity to bring new words so that the at_least_x_words_filled flag would not be asserted. The process S150 then terminates.

A discussion of the write data handshake cycle will now be discussed. As shown in FIG. 6b, the at_least_x_words_empty flag indicates to ATM_SYS block 54 the number of empty storage locations in the WR FIFO 52 at every mclk cycle. The ATM_SYS block 54 determines when to assert the atm_wr_en signal based on the assertion of the at_least_x_words_empty flag. As shown, the ATM_SYS block 54 may assert the atm_wr_en signal as desired, so long as the at_least_x_words_empty flag is asserted. When the at_least_x_words_empty flag is deasserted in the tenth mclk cycle, the atm_wr_en signal is deasserted in the following (i.e., eleventh) mclk cycle. Since writing is under the control of the Core 22, and the System-IO interface 20 will eventually empty out the entire WR FIFO 52, no lingering words will be left in the WR FIFO 52. As a result, there is no need to utilize a wr_done signal.

The write data handshake process will now be discussed with reference to FIG. 6d. Beginning from a start state, the process S170 proceeds to decision step S172, where it queries if the at_least_x_words_empty flag is asserted. If so, the process S170 proceeds to process step S174, where the atm_wr_en signal is asserted, upon which the process S170 returns to decision step S172. If the at_least_x_words_empty flag is deasserted, the process S170 proceeds to process step S176, where the atm_wr_en signal is deasserted. The process S170 then returns to decision step S172 to further monitor the at_least_x_words_empty flag.

The design and definition of the GIO interface 24 provides maximum utilization of the IO bandwidth, specifically, by allowing the System-IO bus 38 to accommodate back-to-back DMA requests and to support the Core 22 segmentation and reassembly functions. In addition, such definition would affect the level of pipe lining of the Core 22 transmit load and receive unload DMA requests. It also allows 2 or 3 requests to be queued across the GIO Interface 24 at the same time in each read and write direction. In addition, the GIO interface 24 permits the Core 22 to read or write data in increments rather than having to wait for the RD FIFO 50 to be completely full or for the WR FIFO 52 to be completely empty. The duplex data path width of 32 bits each per read and write direction matches the data width of the external buffer memory interface 34 (FIG. 3), so that no bandwidth is lost across the GIO interface 24. In addition, the definition of a fixed Core 22 clock ensures that the Core 22 remains unchanged for different embodiments of the NIC 12 which interface to different host computer systems and busses. The last_rd and last_wr signals provide a means for 32-bit, 64-bit, 96-bit, 128-bit, etc. IO data path implementation without placing any restrictions on the IO bus bit width.

Modifications and variations of the embodiments described above may be made by those skilled in the technology while remaining within the true scope and spirit of this invention. Thus, although the present invention has been described in terms of certain preferred embodiments, other embodiments that will be apparent to those of ordinary skill in the technology are also within the scope of this invention. Accordingly, the scope of the invention is intended to be defined only by the claims which follow.

What is claimed is:

1. A method for coordinating data transfer between a System Input/Output (IO) functional block and an Asynchronous Transfer Mode (ATM) functional block, comprising the steps of:

(a) providing a first signal from the ATM functional block to the System IO functional block, for requesting the reading of data from the System IO functional block to the ATM functional block;

(b) providing locational information related to the data to be transferred, from the ATM functional block to the System IO functional block; and (c) providing a second signal from the System IO functional block to the ATM functional block, for acknowledging the request for reading of data, step (b) being independent from step (c), wherein the System IO functional block is synchronous to a first clock, the ATM functional block is synchronous to a second clock which has a clock rate that is different from the clock rate of the first clock and wherein the first and second signals are synchronous to the second clock.

2. The method of claim 1, further comprising the steps of:

(d) providing a third signal from the ATM functional block to the System IO functional block, for requesting the writing of data from the ATM functional block to the System IO functional block;

(e) providing locational information related to the data to be transferred, from the ATM functional block to the System IO functional block; and (f) providing a fourth signal from the System IO functional block to the ATM functional block, for acknowledging the request for writing of data, step (e) being independent from step (f), and steps (a)–(c) being independent from steps (d)–(f).

3. The method of claim 2, wherein the third and the fourth signals are synchronous to the second clock.

4. The method of claim 2, further comprising the step of providing a last write signal from the ATM functional block to the System IO functional block, to indicate that the last word of data has been written to the System IO functional block.

5. The method of claim 1, further comprising the step of:

(d) reading data from the System IO functional block and providing the data to the ATM functional block, wherein the step of reading data is asynchronous from steps (a)–(c).

6. The method of claim 5, further comprising the step of:

(e) writing data located in the ATM functional block, to the System IO functional block, wherein the step of writing is provided in parallel to step (d).

7. The method of claim 1, wherein the step (b), the locational information includes information related to a target device for the request, a memory address from which to retrieve the data, and a size of the data to be transferred.

8. The method of claim 1, further comprising the step of providing a last read signal from the ATM functional block to the System IO functional block, to indicate that the last word of data has been read from the System IO functional block.

9. An interface for transferring data, comprising:

a System IO functional block having a first buffer and a second buffer;

an ATM functional block which provides a first signal to the System IO functional block, for requesting the reading of data from the System IO functional block to the ATM functional block, the ATM functional block also providing locational information related to the data to be transferred to the System IO functional block; and the System IO functional block providing a second signal to the ATM functional block, for acknowledging the request for reading of data, wherein locational information is provided independently from provision of the second signal, wherein the System IO functional block is synchronous to a first clock, the ATM functional block is synchronous to a second clock which has a clock rate that is different from the clock rate of the first clock and wherein the first and second signals are synchronous to the second clock.

10. The interface of claim 9, wherein the ATM functional block further provides a third signal to the System IO functional block, for requesting the writing of data from the ATM functional block to the System IO functional block, the ATM functional block also providing locational information related to the data to be transferred, to the System IO functional block, and wherein the System IO functional block further provides a fourth signal to the ATM functional block, for acknowledging the request for writing of data, wherein locational information is provided independently from provision of the fourth signal and wherein the first signal is provided asynchronously with the third signal.

11. The interface of claim 10, wherein the third and the fourth signals are synchronous to the second clock.

12. The interface of claim 10, wherein the ATM functional block further provides a last write signal to the System IO functional block, to indicate that the last word of data has been written to the System IO functional block.

13. The interface of claim 9, wherein the ATM functional block further reads data from the System IO functional block, and wherein reading of the data is asynchronous to the provision of the first signal.

14. The interface of claim 13, wherein data is written from the ATM functional block to the System IO functional block, and wherein the writing of data is provided in parallel to the reading of data.

15. The interface of claim 9, wherein the locational information includes information related to a target device for the request, a memory address from which to retrieve the data, and a size of the data to be transferred.

16. The interface of claim 9, wherein the ATM functional block further provides a last read signal from the ATM functional block to the System IO functional block, to indicate that the last word of data has been read from the System IO functional block.

17. A System for transferring data in an Asynchronous Transfer Mode network, comprising:

a host processor;

a memory coupled to the host processor;

a System input/output bus coupled to the host processor; and an interface comprising:

a System IO functional block coupled to the System input/output bus, the System IO functional block having a first buffer and a second buffer;

an ATM functional block coupled to the System IO functional block, the ATM functional block providing a first signal to the System IO functional block, for requesting the reading of data from the System IO functional block to the ATM functional block, the ATM functional block also providing locational information related to the data to be transferred to the System IO functional block; and the System IO functional block providing a second signal to the ATM functional block, for acknowledging the request for reading of data, wherein locational information is provided independently from provision of the second signal, wherein the System IO functional block is synchronous to a first clock, the ATM functional block is synchronous to a second clock which has a clock rate that is different from the clock rate of the first clock and wherein the first and second signals are synchronous to the second clock.

18. The System of claim 17, wherein the ATM functional block further provides a third signal to the System IO functional block, for requesting the writing of data from the ATM functional block to the System IO functional block, the ATM functional block also providing locational information related to the data to be transferred, to the System IO functional block, and wherein the System IO functional block further provides a fourth signal to the ATM functional block, for acknowledging the request for writing of data, wherein locational information is provided independently from provision of the fourth signal and wherein the first signal is provided asynchronously with the third signal.

19. The interface of claim 18, wherein data is written from the ATM functional block to the System IO functional block, and wherein the writing of data is provided in parallel to the reading of data.

20. The interface of claim 18, wherein the locational information includes information related to a target device for the request, a memory address from which to retrieve the data, and a size of the data to be transferred.

21. The interface of claim 18, wherein the third and the fourth signals are synchronous to the second clock.

22. The System of claim 17, wherein the ATM functional block further reads data from the System IO functional block, and wherein reading of the data is synchronous to the provision of the first signal.

* * * * *